United States Patent [19]

Thompson

[11] Patent Number: 4,829,878
[45] Date of Patent: May 16, 1989

[54] APPARATUS FOR CARRYING AND RELEASING STORES

[75] Inventor: George Thompson, Jamestown, N. Dak.

[73] Assignee: Western Gear Corporation, Jamestown, N. Dak.

[21] Appl. No.: 190,135

[22] Filed: May 4, 1988

[51] Int. Cl.$^4$ .............................. F41F 5/02; B64D 1/02
[52] U.S. Cl. .................................. 89/1.54; 244/137.4
[58] Field of Search ..................... 89/1.54, 1.815, 1.58, 89/1.819, 1.57; 244/137.4

[56] References Cited

U.S. PATENT DOCUMENTS

| | | | |
|---|---|---|---|
| 2,481,542 | 9/1949 | Schuyler | 89/1.54 |
| 3,008,376 | 11/1961 | Brunow et al. | 89/1.54 |
| 3,273,459 | 9/1966 | Lardin | 89/1.54 |
| 3,936,019 | 2/1976 | Craigie | 244/137.4 |
| 4,008,645 | 2/1977 | Herbert | 89/1.58 |
| 4,313,582 | 2/1982 | Hasquenoph et al. | 244/137.4 |
| 4,440,365 | 4/1984 | Holtrop | 244/137.4 |
| 4,600,171 | 7/1986 | Kalisz | 89/1.54 |
| 4,679,751 | 7/1987 | Peterson | 244/137.4 |
| 4,685,377 | 8/1987 | Mace et al. | 89/1.54 |
| 4,730,535 | 3/1988 | Steinmetz | 89/1.54 |

Primary Examiner—David H. Brown
Attorney, Agent, or Firm—Carothers & Carothers

[57] ABSTRACT

An apparatus for carrying stores such as missiles and the like in a manner which permits the stores to be selectively deployed from a conformal or semi-conformal carriage position, with respect to a mobile vehicle, such as an aircraft, to a launch position from which the stores may be selectively launched, and including apparatus for selectively jettisoning the stores.

12 Claims, 3 Drawing Sheets

APPARATUS FOR CARRYING AND RELEASING STORES

BACKGROUND OF THE INVENTION

There are well known a wide variety of military aircraft which are provided with carriage means for carrying stores such as missiles or bombs with respect to the craft structure. For example, it is well known to mount missiles, rockets, bombs or the like (hereinafter referred to generally as stores) on fixed pylons which project beneath the wings of an aircraft. The stores are retained by the pylons in transit to a target for selective launch, firing or release of the stores from the pylons at the discretion of the pilot or other operator on board the aircraft.

There are also known in the art devices for carrying such stores in a transit position and for selectively deploying the stores to a release position for firing, launch or release thereof. For example, U.S. Pat. No. 4,440,365 of Holtrop discloses a launch mechanism which carries a store close to the body of an aircraft and, in preparation for launch, displaces the store in an arcuate or circular trajectory away from the aircraft by means of a swing arm structure that is pivotally constrained to the aircraft. According to the Holtrop patent, release of the store occurs automatically as the pivotally movable arms which carry the store reach the deployed position.

It is further considered desirable in the art to carry stores on an aircraft in a conformal or semi-conformal orientation with respect thereto. Conformal stowage of stores eliminates disruption of air flow over the exterior surfaces of the aircraft which will otherwise occur if conformal stowage is not used, thereby reducing or eliminating the resultant drag.

Conformal stowage of stores can be difficult to achieve due to limitations on the amount of stowage space available within the craft profile. For example, fully conformed stowage for wing-carried stores has posed difficult design problems. Thus, the art has also contemplated semi-conformal configurations in which stores are carried for transit partially within a pocket or cavity formed in the aircraft structure, with adjacent exterior surfaces of the wing or fuselage being faired out to blend with projecting portions of the stores and thereby minimize disruption of air flow over the adjacent surfaces.

As has been noted, conformal or semi-conformal carriage of stores is a highly desirable objective which can be instrumental in reducing aircraft power requirements thereby creating the opportunity for design improvements in fuel economy and flight range. However, attempts to develop conformal or semi-conformal stowage for stores have not been entirely successful.

For example, the prior art of deployable store carriage as represented by the above-cited Holtrop patent has made no provision for deployment and retraction of the store carriers independent of store firing or launch. According to the Holtrop patent, release of the store occurs automatically as the store carriage apparatus reaches its deployed position. Thus, once the deployment decision has been made and executed, store launch is an inevitable consequence. In addition, the prior art makes no provision for jettisoning stores, as an alternative to normal launch thereof, in a deployable aircraft-carried launch apparatus. Still further, the prior art has not contemplated apparatus for carrying multiple stores on a common, deployable carriage apparatus.

BRIEF SUMMARY OF THE INVENTION

The present invention overcomes the above and other shortcomings of the prior art through the provision of a novel store carrying apparatus which includes a deployable pallet that carries, preferably, a plurality of stores in individual store containments, for example rockets in launch tubes, which stores are retained with respect to the pallet by independently operable release means that may be individually actuated to jettison selected ones of the stores and containments. The jettison system is operable independently of pallet orientation or position with respect to the aircraft.

The pallet and the stores carried thereby are movable as a unit between a stowed and a deployed orientation with respect to the aircraft, the stowed position preferably being a semi-conformed or fully conformed configuration with respect to exterior surfaces of the aircraft. Still further, the stores may be individually launched after deployment but independently of operation of the pallet deployment apparatus.

Accordingly, the invention provides the capability for a store, and preferably multiple stores, to be moved in unison from a fully conformed or semi-conformed stowed orientation to a deployed orientation, and to be retracted again to the stowed orientation with or without launch of one or more of the stores. The multiple stores may be launched individually after deployment thereof, and remaining stores may be returned to the stowed orientation at will.

Furthermore, the invention permits multiple stores, and the containments therefor to be jettisoned (in lieu of launching) individually and independently of the position of the deployment apparatus, whereby jettisoning is possible in an emergency situation without the operator having to first ensure that the deployment apparatus is in a specified position.

Accordingly, it is one object of the present invention to provide a novel and improved store carriage, deployment, launch and jettisoning apparatus.

It is a further object of the invention to provide an apparatus which is operable to launch a store or stores after deployment thereof but independently of store deployment apparatus operation.

Yet another object of the invention is to provide a store carriage apparatus which permits jettisoning of selected stores and/or their containments independently of store carriage apparatus position with respect to the aircraft.

Yet another object of the invention is to provide a store carriage and deployment apparatus in accordance with any of the above objects which is operable to selectively retain stores in a semi-conformal or fully conformal configuration with respect to exterior surfaces of an aircraft.

These and other objects and further advantages of the invention will be more readily appreciated upon consideration of the following detailed description and accompanying drawings, in which.

Figure 1:
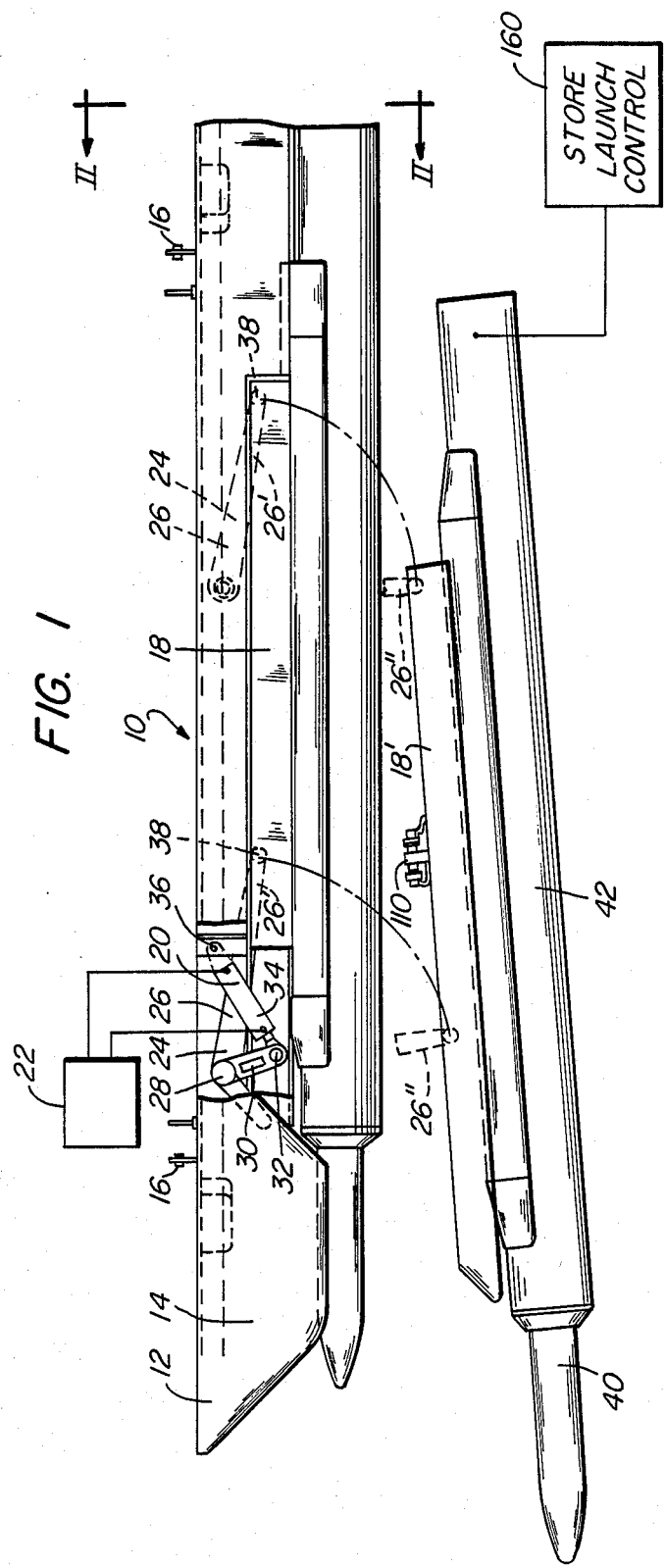
FIG. 1 is a partially sectioned side elevation of a store deployment and launch apparatus according to one presently preferred embodiment of the invention.

There is generally indicated at 10 in FIG. 1 a store deployment and release apparatus which is carried by an aircraft in a conformal or semi-conformal configuration with respect thereto. For example, apparatus 10 may be carried within a partially or fully enclosed pocket 12 formed within the fuselage of an aircraft. The apparatus 10 comprises a fixed rail 14 which is secured as by lugs 16 with respect to the aircraft (not shown). A store carrying pallet 18 is movably carried with respect to rail 14 by means including a deployment apparatus 20 which is suitably powered, for example by a hydraulic power system 22, to move pallet 18 between a stowed position as shown at 18, and a deployed position as shown at 18'.

For example, pallet 18 may be moved between the stowed and deployed positions by a plurality of swing arm structures 24, two for example, each of which includes one or more elongated swing arms 26 having one longitudinal end thereof rigidly affixed with respect to a pivot axis 28 that is suitably journaled in bearings (not shown) carried by rail 14. Also affixed with respect to one or both of pivot axes 28 is a drive assembly comprised of a crank arm 30 having an outer end which is pivotally secured as at 32 to one end of a respective fluid operable piston and cylinder assembly 34. The opposed end of the piston/cylinder assembly 34 is pivotally affixed as at 36 to rail 14 whereby, upon application of motive fluid pressure to extend or retract the piston/cylinder assembly (or assemblies) 34, crank 30 rotates pivot axis 28, and thus the swing arms 26, between extreme positions thereof defined as a stowed position 26', and a deployed position 26''. Swing arms 26 have their outer or free ends pivotally secured as at 38 to pallet 18 whereby, upon actuation of piston/cylinder assemblies 34 the resultant movement of the swing arms 26 moves pallet 18 between the stowed position 18 and the deployed position 18'.

Figure 2:
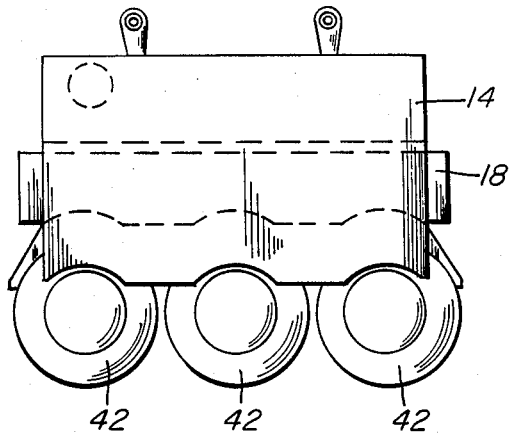
FIG. 2 is an end elevation taken on view lines I—II of FIG. 1.

Pallet 18 carries one or more stores, for example one or more missiles 40 carried within respective cannisters or missile tubes 42, which tubes are releasably secured to pallet 18 by selectively releasable securing means to be described hereinbelow. As shown in FIG. 2, pallet 18 may carry a multiplicity of missile cannisters 42 in side by side relation, each such missile cannister being independently releasably secured with respect to pallet 18 as hereinbelow described.

Figure 3:
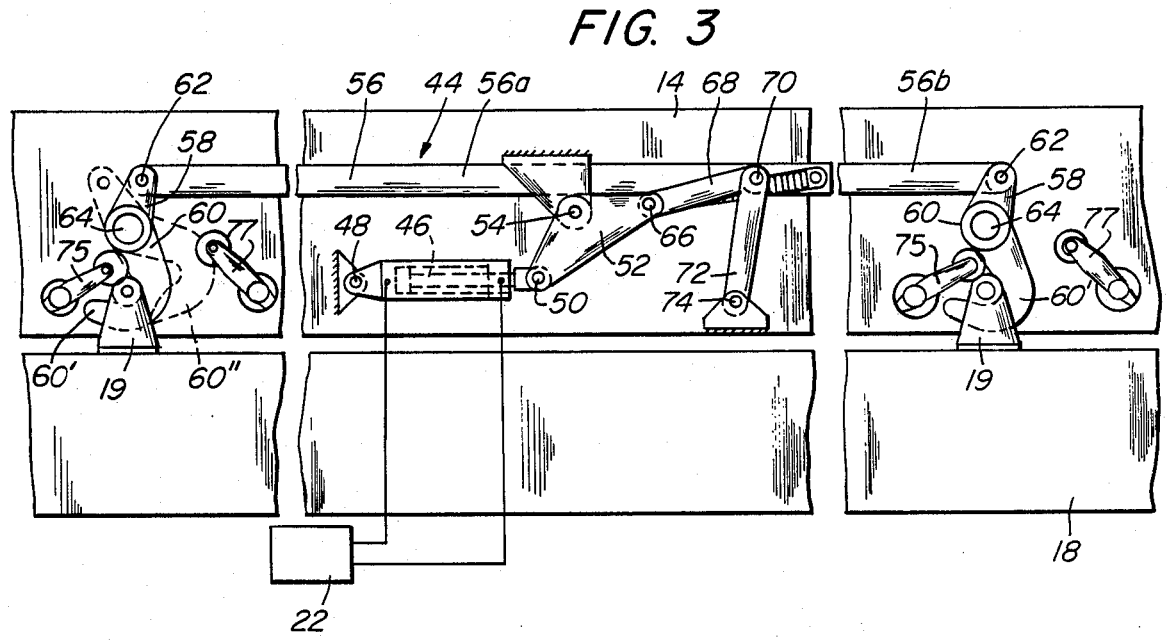
FIG. 3 is a sectioned side elevation of a fragment of the apparatus in FIG. 1 showing a store retention apparatus which is operable in conjunction with operation of the store deployment apparatus of FIG. 1.

The apparatus by which pallet 18 is secured or retained with respect to rail 14 additionally includes a latching retention apparatus generally indicated at 44 in FIG. 3 and operable in conjunction with operation of the swing arm assemblies 24 to secure pallet 18 in the stowed position with respect to rail 14. The apparatus 44 preferably is carried entirely within the confines of rail 14, and includes a fluid operable piston and cylinder assembly 46 which is pivotally affixed adjacent one end thereof with respect to rail 14, as indicated at 48. The opposed longitudinal end of assembly 46 is pivotally affixed as at 50 to one pivot of a bell crank 52 which is also pivotally affixed as at 54 with respect to rail 14.

An elongated link 56 means extends longitudinally within rail 14 between crank arm portions 58 of a pair of longitudinally spaced retention hooks 60 and is pivotally secured thereto as by pivot connections 62. Link means 56 preferably includes a pair of elongated link portions 56a, 56b which are pivotally secured together by pivot 70. Hooks 60 are in turn pivotally secured with respect to rail 14 as by pivots 64 to be thus pivotable between a lug engaging position 60', and a disengaged position 60''. The link means 56 constrains the hooks 60 to move between the respective engaged and disengaged positions thereof in unison.

The remaining pivot connection 66 of bell crank 52 has pivotally secured thereto an elongated link 68 which is also pivotally affixed, in common with one end of an elongated support link 72, to link means 56 at pivot 70. The opposed end of support link 72 is pivotally affixed as at 74 with respect to rail 14.

Also provided to facilitate operation of retention apparatus 44 are micro switches 75 and 77 or similar suitable position sensitive controls which coordinate operation of cylinder assembly 46 with operation of cylinder assemblies 34 in a manner to be described hereinbelow.

Figure 4:
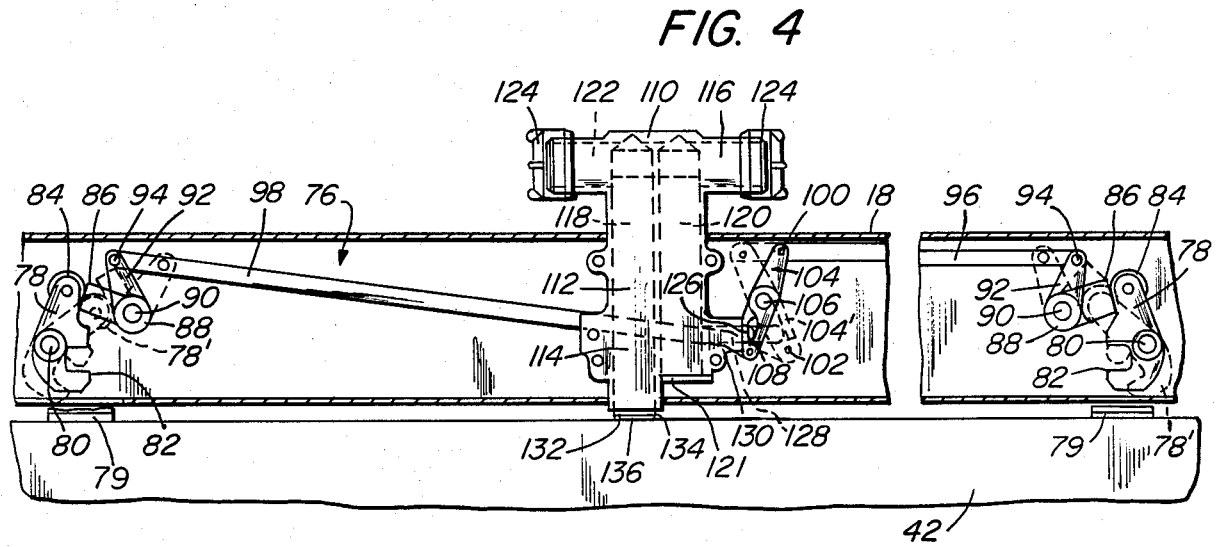
FIG. 4 is a sectioned side elevation of a fragmentary portion of the apparatus of FIG. 1 showing a store jettisoning apparatus therefor.

Apparatus 10 still further contemplates an independently operable jettisoning or release apparatus for each store 42 and generally indicated at 76 in FIG. 4. Each jettisoning apparatus 76 is carried within pallet 18 and comprises a pair of longitudinally spaced retention hooks 78 which are pivotally affixed with respect to pallet 18 as at 80. To retain a respective store 42, the recesses 82 of each pair of hooks 78 are engageable with suitable store lugs 79, which may be similar to lugs 19 of FIG. 3, but are only partially shown in FIG. 4.

Adjacent the opposed end of each hook 78 is a pivotally carried cam follower 84 which is disposed to ride on a cam surface 86 of a rotatable cam element 88 which is pivotally affixed with respect to pallet 18 as at 90. Each cam element 88 also includes a crank or lever arm portion 92 which is pivotally affixed as at 94 to a respective elongated link 96, 98.

The opposed longitudinal ends of the links 96 and 98 are pivotally affixed as at 100 and 102, respectively, to the opposed ends of a double ended crank 104 that is pivotally affixed with respect to pallet 18 as by pivot 106. Crank 104 includes an actuator surface portion 108 which is cooperable with a selectively operable actuating means embodied as a gas powered piston and cylinder assembly 110 which is carried by pallet 18 adjacent to crank 104.

Cylinder assembly 110 includes a unitary rigid body 112 preferably formed of machined metal and including an elongated upstanding body portion 114 and a head portion 116 adjacent the uppermost end of body portion 114. A pair of elongated bores 118 and 120 extend in mutually parallel relation within upstanding body portion 114 and both intersect a through bore 122 extending within head portion 116. The opposed open ends of head porton 116 are externally threaded to receive cooperably internally threaded cap elements 124 which, when in place, close the opposed open ends of bore 122. Bore 118 is open at its lower end to receive a jettisoning piston, whereas bore 120 is closed by a plate 121.

An actuator piston 126 is slideably disposed within a bore 128 that extends transversely within a boss portion 130 of body portion 114 and is in open communication with bore 120. Upon operation of actuator 110, piston 126 extends to engage actuating portion 108 of crank 104 thereby rotating crank 104 counter-clockwise (as viewed in FIG. 4) to position 104' and pulling both of links 96 and 98 whereby cam elements 88 rotate to move camming surfaces 86 out of the path of travel of cam followers 84 on respective retention hooks 78. Hook jaws 82 provide a lever arm with respect to pivot 80 of each hook 78 such that the hanging weight of store 42, transmitted to hooks 78 via lugs 79, is effective to rotate hooks 78 to the release position 78' upon movement of cam surfaces 86 out of engagement with cam followers 84. Also upon operation of actuator 110, a jettisoning piston 132, which is disposed within bore 118, is ejected from a lower open end 134 thereof. The outer end 136 of piston 132 is normally maintained adjacent to the respective store, in this case the missile cannister 42, which is carried by pallet 18. Accordingly, operation of actuator 110 not only releases hooks 78 to permit them to release the standard store retention lugs 79, it also forces the released store 42 away from pallet 18 under the impetus of actuating force which is tending to expel piston 132 from bore 118.

The motive force to operate actuator 110 is provided in the known manner by pyrotechnic charges inserted within bore 122 and retained by caps 124. Upon actuation, as by electrically initiated detonation for example, the explosive force of the detonation within bore 122 creates elevated pressure within body 112 to drive pistons 126 and 132 outwardly of the respective bores 128, 118 thereby simultaneously permitting release of hooks 78 and urging store 42 downwardly away from pallet 18.

Jettisoning apparatus 76 permits each store 42 to be jettisoned from pallet 18 independently of pallet position with respect to rail 14 and independently of other stores 42 carried by pallet 18. Accordingly, and as above noted, the described jettisoning system is duplicated for each store retention position on pallet 18, in the described embodiment three such jettisoning systems 76 being provided, one for each of the three store retention positions on pallet 18.

Missiles 40 may also be individually launched from their respective cannisters 42 in a conventional manner, as by electrical motor ignition system 160 such as shown schematically in FIG. 1, for example, but unlike conventional systems launch is achieved after deployment of pallet 18 and independently of pallet deployment. That is, store launch does not automatically follow deployment but is independently initiated. Accordingly, pallet 18 may be deployed to the launch position, and later retracted again to the stowed position, with or without the intervening launch of any one or more of the stores carried thereby.

Figure 5:
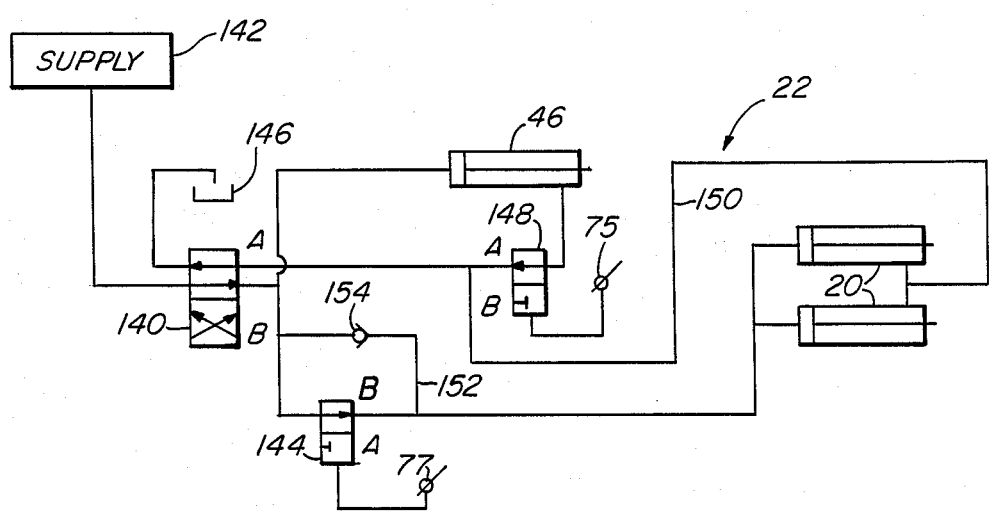
FIG. 5 is a simplified schematic diagram of a hydraulic power system for control of the apparatus of FIGS. 1-4.

Operation of the deployment apparatus in moving pallet 18, and the stores carried thereby, with respect to rail 14 from the stowed to the deployed or launch position proceeds as follows. Referring to FIGS. 1, 3 and 5, a pilot operated valve 140 is actuated to a position A in hydraulic power system 22 to supply motive fluid from a supply source 142 to the piston/cylinder assembly 46 (to release pallet retention hooks 60), and to piston/cylinder assemblies 20. The inlet of piston/cylinder assembly 20 is closed by a valve 144 which is in the A position, the valve 144 being controlled by control switches 77. Thus, fluid flow from supply 142 extends the piston rod of piston/cylinder assembly 46 to thereby rotate bell crank 52, open hooks 60 and release pallet retention lugs 19. As hooks 60 open, they contact and actuate control switches 77 which in turn actuate valve 144 to the B position thereby opening the inlet side of piston/cylinder assembly 20 to motive fluid supply 142. Accordingly, the piston rod of piston/cylinder assembly 20 begins to extend thereby turning cranks 30 and rotating swing arms 26 downward toward the deployed position 26'. As pallet 18 begins its movement away from rail 14, lugs 19 disengage and release control switches 75 which in turn actuate a shut off valve 148 to the B position to isolate the forward end of piston/cylinder assembly 46 from fluid supply for a major part of the retraction cycle as below described. With continuing fluid supply, piston/cylinder assemblies 20 extend to move pallet 18 to the fully deployed position.

To retract pallet 18 from the deployed position and return it to the stowed position, valve 140 is actuated to the B position to direct motive fluid pressure via conduit 150 to piston/cylinder assemblies 20 thereby initiating upward rotation of swing arms 26 and retracting the pallet 18 toward the stowed position. Near the end of the available range of movement for arms 26, lugs 19 engage control switches 75 which in turn actuate valve 148 to the A position. This opens the forward end of piston-cylinder assembly 46 to motive fluid flow. Accordingly, piston and cylinder assembly 46 begins to retract thereby rotating bell crank 52 in the clockwise direction as shown and closing hooks 60 about lugs 19 by action of the link 56. As hooks 60 begin to close, they incidentally disengage control switches 77 which in turn actuate valve 144 to the A position; however, for the duration of the retraction cycle, and regardless of the position of valve 144, the rearward ends of piston/cylinder assemblies 20 remain open to reservoir 146 via a return line 152 having a one way flow check valve 154. Return line 152 bypasses valve 144 and is the primary return fluid flow path, even when valve 144 is open. When hooks 60 again fully engage lugs 19, the pallet 18 has been returned fully to the stowed position.

According to the description hereinabove there is provided by the instant invention a novel and improved apparatus for carrying and releasing stores which is operable to selectively move the stores between a stowed position and a deployed position, and is independently operable to selectively launch one or a plurality of such stores when in the deployed position, or to jettison one or a plurality of such stores independently of operation of the deployment apparatus and irrespective of the position of the deployment apparatus with respect to the craft carrying the stores. The apparatus is thus operable to facilitate the carriage of multiple stores and selective deployment of one or a plurality of stores, as well as the independent launch or jettisoning of individual ones of such stores. The stores thus may be deployed in groups from a stowed position to a deployed position and then may be launched individually or in selected groups, jettisoned individually or in selected groups, or retained and ultimately retracted to the stowed position. In addition, the stores may be selectively jettisoned individually or in groups from the stowed position.

Of course, I have contemplated various alternative and modified embodiments of the invention and such would certainly also occur to others versed in the art once apprised of my invention. Accordingly, it is my intent that the invention be construed broadly and limited only by the scope of the claims appended hereto.

I claim:

1. An apparatus adapted to be carried by a mobile craft for carrying a store means with respect to such a mobile craft and for selective release of such store means therefrom comprising:

a base means adapted to be retained closely adjacent such a mobile craft;

a pallet means disposed adjacent said base means and adapted to releasably carry thereon such a store means;

deployment means retaining said pallet means with respect to said base means;

said deployment means being selectively operable to move said pallet means between a stowed orientation with respect to said base means and a deployed orientation with respect thereto whereat said pallet means is disposed relatively further from said base means than when in said stowed orientation; and release means associated with said pallet means and selectively operable independently of the position of said pallet means with respect to said base means to retain or jettison such a store means with respect to said pallet means.

2. The apparatus as set forth in claim 1 additionally including launch means for selectively launching said store means which are retained with respect to said pallet means.

3. The apparatus as set forth in claim 1 wherein said store means includes a plurality of independent stores.

4. The apparatus as set forth in claim 3 wherein said release means includes means operable to retain or jettison any selected ones of said independent stores with respect to other of said independent stores.

5. The apparatus as set forth in claim 1 additionally including launch means for selectively launching any selected ones of said plurality of stores retained with respect to said pallet means.

6. The apparatus as set forth in claim 5 additionally including means for precluding operation of said launch means when said pallet means is not disposed in said deployed orientation.

7. The apparatus as set forth in claim 1 additionally including retention means which is selectively operable in conjunction with operation of said deployment means to selectively fixedly retain said pallet means with respect to said base means in said stowed orientation.

8. The apparatus as set forth in claim 7, additionally including motive power means for driving said pallet retention means and said deployment means.

9. The apparatus as set forth in claim 8 wherein said motive power means includes first position responsive control means which is operative in cooperation with said retention means to preclude motive power supply to operate said deployment means when said pallet means is retained by said retention means.

10. The apparatus as set forth in claim 9 wherein said motive power means additionally includes second position responsive means which is operative in response to movement of said pallet means to preclude motive power supply to said retention means when said pallet means is displaced from said stowed orientation.

11. The apparatus as set forth in claim 10 wherein said store means includes a plurality of independent stores.

12. A store carrying apparatus comprising:

a rail structure adapted to be supported closely adjacent a supporting structure;

a pallet means disposed adjacent said rail structure;

deployment means which retains said pallet means with respect to said rail structure;

said deployment means being selectively operable to move said pallet means with respect to said rail structure between a deployed position spaced from said rail structure and a stowed position relatively more closely adjacent said rail structure;

said pallet means including store retention means for retaining a plurality of stores with respect thereto; and said store retention means being selectively operable to release any selected ones of such a plurality of stores retained thereby independently of the position of said pallet means with respect to said rail structure.

* * * * *